United States Patent
Anderson et al.

(10) Patent No.: US 7,390,470 B2
(45) Date of Patent: Jun. 24, 2008

(54) PROCESS FOR TREATING A GAS STREAM

(75) Inventors: Mark C. Anderson, Spring, TX (US); Michael F. Ray, Spring Branch, TX (US); Ronald Shafer, Overland Park, KS (US)

(73) Assignee: Thiosolv, L.L.C., Spring Branch, TX (US)

( * ) Notice: Subject to any disclaimer, the term of this patent is extended or adjusted under 35 U.S.C. 154(b) by 0 days.

(21) Appl. No.: 11/750,274

(22) Filed: May 17, 2007

(65) Prior Publication Data
US 2007/0269357 A1     Nov. 22, 2007

Related U.S. Application Data

(60) Provisional application No. 60/800,971, filed on May 17, 2006.

(51) Int. Cl.
*B01D 53/50* (2006.01)
*B01D 53/52* (2006.01)
*B01D 53/58* (2006.01)
*G05D 21/00* (2006.01)

(52) U.S. Cl. .................. 423/220; 423/222; 423/237; 423/238; 423/243.06; 423/547; 423/DIG. 5; 422/105; 422/108; 422/111

(58) Field of Classification Search ................. 423/220, 423/222, 243.06, 547, DIG. 5, 237, 238; 422/105, 108, 111
See application file for complete search history.

(56) References Cited

U.S. PATENT DOCUMENTS

| | | | |
|---|---|---|---|
| 1,079,291 A | 11/1913 | Feid | |
| 2,898,190 A | 8/1959 | Grosskinsky et al. | |
| 3,524,724 A | 8/1970 | Every et al. | |
| 3,584,042 A | 6/1971 | Yavorsky et al. | |
| 3,627,465 A | 12/1971 | Hamblin | |
| 3,635,820 A | 1/1972 | Urban | |
| 3,773,900 A * | 11/1973 | Roberts et al. | 423/356 |
| 3,833,714 A * | 9/1974 | Renault et al. | 423/567.1 |
| 3,859,414 A * | 1/1975 | Urban | 423/222 |
| 4,008,310 A | 2/1977 | Gorin | |
| 4,478,807 A | 10/1984 | Ott | |
| 4,579,727 A | 4/1986 | Cronkright et al. | |
| 4,960,575 A * | 10/1990 | Bedell et al. | 423/222 |
| 5,618,658 A | 4/1997 | Penman et al. | |
| 6,159,440 A | 12/2000 | Schoubye | |
| 6,534,030 B2 | 3/2003 | Anderson et al. | |
| 6,605,263 B2 * | 8/2003 | Alix et al. | 423/243.06 |
| 6,818,194 B2 | 11/2004 | DeBerry et al. | |
| 7,052,669 B2 | 5/2006 | Schoubye et al. | |
| 2003/0039606 A1 | 2/2003 | Schoubye et al. | |
| 2003/0072707 A1 | 4/2003 | Ray et al. | |
| 2003/0223930 A1 | 12/2003 | Schoubye et al. | |

* cited by examiner

*Primary Examiner*—Timothy C. Vanoy
(74) *Attorney, Agent, or Firm*—D'Ambrosio & Associates, PLLC; Jo Katherine D'Ambrosio

(57) ABSTRACT

Processes for selectively removing sulfur-containing compounds from a gas are described herein. The processes generally include contacting a first gas including carbon dioxide and hydrogen sulfide with a scrub solution including ammonium bisulfite and ammonium sulfite in a first contact zone to produce a first contact zone effluent liquid including ammonium thiosulfate and a first contact zone overhead gas including carbon dioxide.

26 Claims, 2 Drawing Sheets

PROCESS FOR TREATING A GAS STREAM

PRIORITY CLAIM

This application claims benefit of U.S. Provisional Application Ser. No. 60/800,971, filed May 17, 2006.

FIELD OF THE INVENTION

The present invention relates to a process for removing hydrogen sulfide from a carbon dioxide-containing gas by converting the hydrogen sulfide to ammonium thiosulfate.

BACKGROUND

Hydrogen sulfide ($H_2S$) and carbon dioxide ($CO_2$) are commonly found together in gases and liquids in the energy production and chemical industries. These gases include hydrocarbon gases synthesized from coal, petroleum coke, residual oils, shale oil, tar sands, biomass, and other carbonaceous materials. Hydrogen sulfide is poisonous and considered a pollutant that contributes to acid rain. Therefore, hydrogen sulfide must be prevented from escaping into the atmosphere. Common methods for removing hydrogen sulfide from a liquid or gas include scrubbing with either a physical solvent, such as SELEXOL®, an alkaline solvent, such as solutions of amine, or inorganic bases, such as sodium hydroxide and direct liquid oxidation technologies like SULFEROX® and LOCAT®. Unfortunately, carbon dioxide is also soluble in most physical solvents and has a greater affinity for alkaline solvents than hydrogen sulfide. The carbon dioxide competes with the hydrogen sulfide for the solvent, requiring increased solvent circulation rates and regeneration temperatures to remove the hydrogen sulfide. Therefore, the expense of removing hydrogen sulfide from a mixture including carbon dioxide is greatly increased.

In addition to hydrogen sulfide and carbon dioxide, ammonia ($NH_3$) is also frequently found in gases and liquids of the energy production and chemical industries. Like hydrogen sulfide, ammonia must be separated and contained to prevent its release. The separation of ammonia from liquids and gases is often performed by washing with water, The ammonia and hydrogen sulfide solublized in the water are then separated from the water by distillation in a sour water stripper, producing an off gas comprising ammonia. Disposing of ammonia can be both expensive and dangerous.

SUMMARY OF THE INVENTION

The present invention provides a process for efficiently removing hydrogen sulfide from a gas which comprises carbon dioxide by converting the hydrogen sulfide to ammonium thiosulfate under conditions where carbon dioxide is nearly inert. The process yields ammonium thiosulfate product, which has commercial value. According to U.S. Pat. No. 6,534,030, ammonium thiosulfate can be produced by contacting a feed gas containing ammonia and hydrogen sulfide with an aqueous stream containing ammonium sulfite and ammonium bisulfite. Advantageously, the process of the invention reduces the cost of removing hydrogen sulfide in comparison to the use of physical or reactive solvents, The ammonium thiosuifate product is also marketable, which can offset the process costs.

In one embodiment, the process comprises contacting a first gas comprising carbon dioxide and hydrogen sulfide with a scrub solution comprising ammonium bisulfite and ammonium sulfite in a first contact zone. The first contact zone produces a first contact zone effluent liquid comprising ammonium thiosulfate and a first contact zone overhead gas comprising carbon dioxide. The scrub solution can be produced by contacting ammonia and sulfur dioxide with an aqueous solution in a second contact zone. The sulfite ion concentration of the first contact zone effluent can be controlled by modulating the amount of sulfur dioxide supplied to the second contact zone. Modulating the amount of sulfur dioxide supplied to the second contact zone can be done in response to either the oxidation potential of the first contact zone effluent or the sulfite concentration of the first contact zone effluent liquid as measured with an infrared analyzer.

In another embodiment of the process of this invention, the first contact zone overhead gas stream comprising carbon dioxide is contacted with solvent to remove carbon dioxide in a first solvent scrubber. The solvent is then regenerated to release the carbon dioxide, if the first contact zone overhead gas includes hydrogen sulfide, a third contact zone can be used to contact the regeneration overhead gas with a portion of the second contact zone effluent liquid to remove hydrogen sulfide.

In yet another embodiment, the second gas stream containing sulfur dioxide supplied to the second contact zone is first treated in a second solvent scrubber to reduce the sulfur dioxide content. The heat added to a second solvent regenerator may be modulated to control the amount of sulfur dioxide remaining in the gas supplied to the second contact zone.

In still another embodiment, the ammonia supplied to the second contact zone is produced by distilling sour water in a second fractionator after a first fractionator is used to remove hydrogen sulfide from the sour water. In another aspect, the amount of ammonia supplied to the second contact zone can be modulated in response to the pH in the second contact zone.

DETAILED DESCRIPTION

This invention provides an economically efficient process for treating a gas, such as a hydrocarbon gas, which comprises both hydrogen sulfide and carbon dioxide contaminants. A scrub solution comprising ammonium sulfite and ammonium bisulfite is employed to react with the hydrogen sulfide to form ammonium thiosulfate according to the following overall reaction:

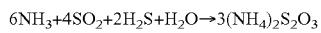

$$6NH_3 + 4SO_2 + 2H_2S + H_2O \rightarrow 3(NH_4)_2S_2O_3$$

Ammonium thiosulfate is a marketable product and may be sold to offset the cost of treating the gas. Additionally, the hydrogen sulfide is converted to a non hazardous material.

Advantageously, carbon dioxide is non-reactive with ammonium sulfite and ammonium bisulfite in the scrub solution. Therefore, in contrast to most physical and alkaline solvents, the scrub solution selectively captures hydrogen sulfide and rejects the carbon dioxide present in the gas.

Figure 1:
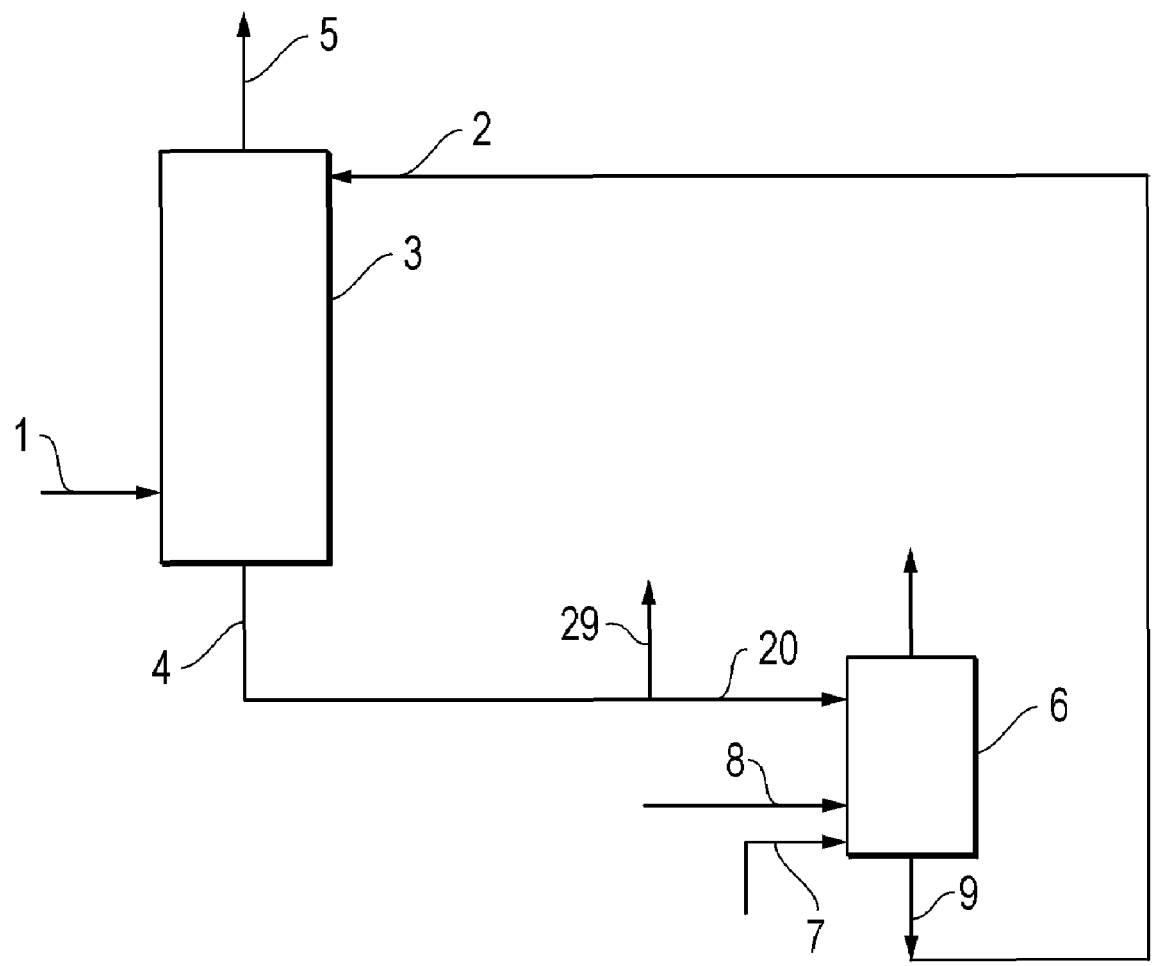
FIG. 1 is a schematic diagram of one embodiment of the process.

Referring now to FIG. 1, a first embodiment of the process for removing sulfur-containing compounds from a gas comprising hydrogen sulfide and carbon dioxide is shown. This embodiment comprises contacting a first gas 1 with a scrub solution 2 in a first contact zone 3. For the purposes of this invention the term contact zone includes any combination of towers, columns, trays, vessels, pumps, valves, control systems, and any other equipment known in the art useful in facilitating the contact of a liquid and a gas. The first gas 1 comprises hydrogen sulfide and carbon dioxide. The first gas 1 may also comprise various hydrocarbons. The scrub solution 2 is aqueous and comprises ammonium bisulfite and ammonium sulfite. It should be readily understandable to persons skilled in the art that ammonium sulfite and ammonium bisulfite are present in ionic form in the scrub solution. Optionally, the scrub solution 2 may be produced by contacting ammonia and sulfur dioxide with an aqueous solution in a second contact zone 6 or may be provided from any other suitable source.

In the first contact zone 3, hydrogen sulfide reacts with ammonium sulfite and ammonium bisulfite to form ammonium thiosulfate. The first contact zone 3 produces a first contact zone effluent liquid 4 and a first contact zone overhead gas 5. The first contact zone effluent liquid 4 comprises ammonium thiosulfate. The first contact zone overhead gas 5 comprises carbon dioxide. A portion of the first contact zone effluent may be removed as the ammonium thiosulfate product 29.

In a second embodiment of the process for removing sulfur-containing compounds from a gas, the scrub solution 2 may be produced by contacting ammonia and sulfur dioxide with an aqueous solution in a second contact zone 6, This second embodiment comprises contacting the first gas 1 comprising carbon dioxide and hydrogen sulfide with the scrub solution 2 comprising ammonium bisulfate and ammonium sulfite in the first contact zone 3. The resulting reaction produces ammonium thiosulfate. The scrub solution 2 may further comprise ammonium thoisulfate. The first contact zone 3 produces a first contact zone overhead gas 5 comprising carbon dioxide and a first contact zone effluent liquid 4 comprising ammonium thiosulfate. At least a portion of the first contact zone effluent 4 may be removed as ammonium thiosulfate product 29.

The second embodiment further comprises contacting a second gas 7, comprising sulfur dioxide, with a third gas 8, comprising ammonia, and a feed liquid, comprising at least a portion of the first contact zone effluent 4, in a second contact zone 6. This yields ammonium bisulfite and ammonium sulfite. The second contact zone 6 produces a second contact zone effluent liquid 9 comprising the ammonium bisulfite and ammonium sulfite. The second contact zone effluent liquid 9 can further comprise ammonium thiosulfate. At least a portion of the second contact zone effluent 9 is fed to the first contact zone 3 as the scrub solution 2.

Stoichiometrically, for each molecule of hydrogen sulfide converted to ammonium thoisulfate in the first contact zone 3, two molecules of sulfur dioxide must be converted to ammonium sulfite and ammonium bisulfite in the second contact zone 6. The amount of ammonium sulfite and ammonium bisulfite in the feed liquid 20 added to the second contact zone 6 determines the amount of sulfur dioxide that must added to the second contact zone 6. In the second contact zone 6, the ammonia and sulfur dioxide form the ammonium sulfite and ammonium bisulfite. Generally, the amount of ammonium sulfite and ammonium bisulfite in the scrub solution 2 fed to the first contact zone 3 is maintained at an stoichiometric excess to the hydrogen sulfide in the first gas 1.

In one aspect of the invention, the sulfite concentration of the feed liquid 20 may be controlled. For the purposes of this invention, "sulfite" includes any combination of sulfite ion, bisulfite ion, ammonium sulfite, andlor ammonium bisulfite. The amount of sulfite available to react with hydrogen sulfide to form ammonium thiosulfate is a product of the sulfite concentration and the flow rate of the liquid. The sulfite concentration of feed liquid 20 can be controlled on the basis of the sulfite concentration of the first contact zone effluent 4, as measured with an infrared analyzer, by modulating the amount of sulfur dioxide supplied to the second contact zone 6 via the second gas 7. In general, an infrared analyzer uses the absorption of infrared light to measure the concentration of various chemical species in a solution.

Alternatively, the ammonium sulfite and ammonium bisulfite concentrations of the feed liquid 20 may be controlled by modulating the amount of sulfur dioxide supplied to second contact zone 6 in response to the oxidation potential of the first contact zone effluent liquid 4. Oxidation potential is the electrical potential of the liquid, which is a function of the concentrations of ammonium sulfite, ammonium bisulfite, ammonium thiosulfate, and their ionic forms. Typically, oxidation potential is measured with an oxidation potential meter, which measures the electrical potential of the solution versus a standard reference electrode. The desired set point for the oxidation potential can be empirically determined for each individual application of the process of this invention.

Figure 2:
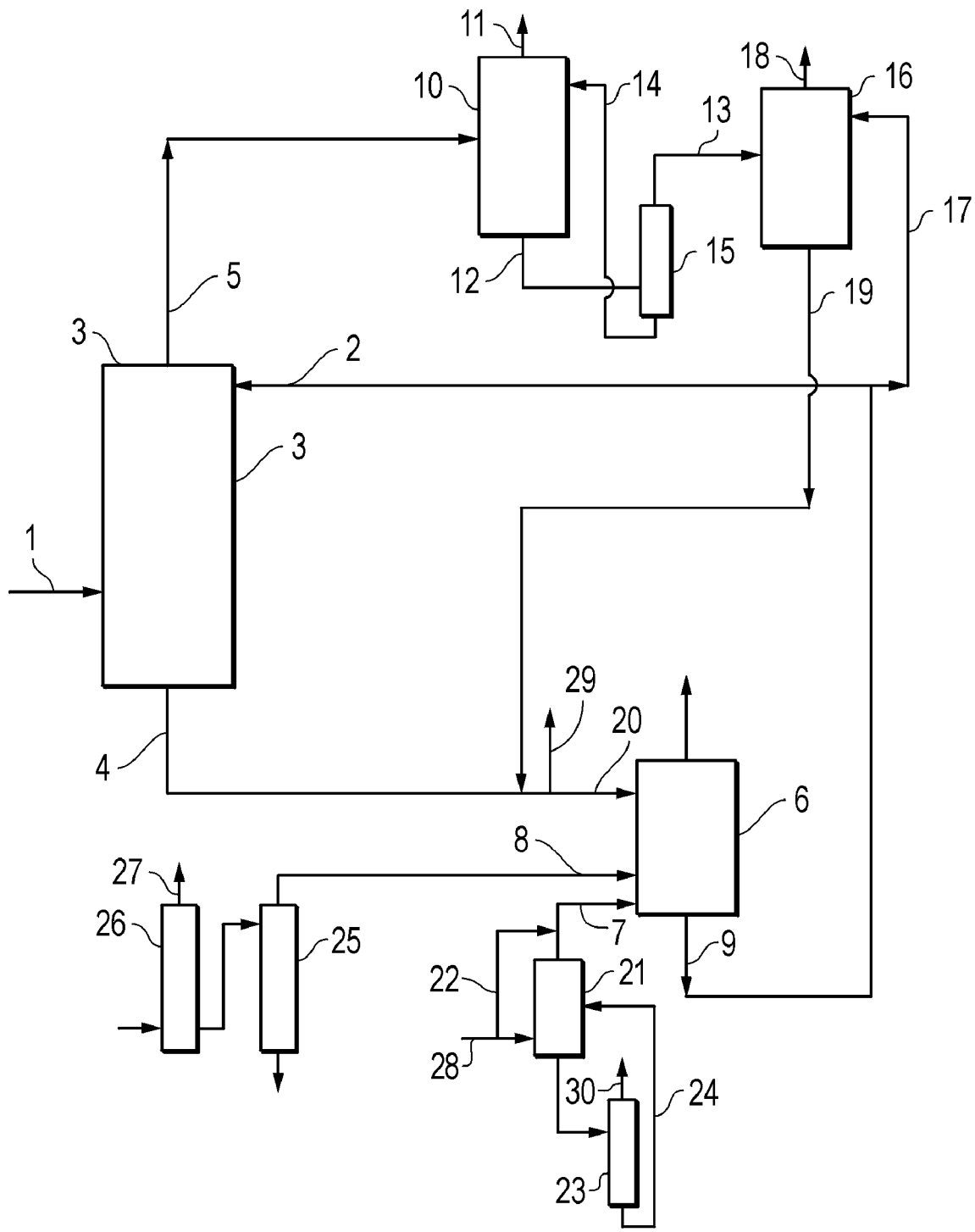
FIG. 2 is a schematic diagram of another embodiment of the process.

Referring now to FIG. 2, in another embodiment of the invention, after treatment in the first contact zone, the first contact zone overhead gas 5 is contacted with a solvent 14 in a first solvent scrubber 10 to remove carbon dioxide from the first contact zone overhead gas 5. The solvent 14 employed in the first solvent scrubber 10 may be any suitable solvent known in the art capable of removing carbon dioxide from a gas. An example of such a solvent is an amine solvent. The first solvent scrubber 10 produces a first solvent scrubber overhead gas 11 and a first solvent scrubber effluent 12. The first solvent scrubber effluent 12 is regenerated in a first solvent regenerator 15 to produce a regeneration overhead gas 13 comprising carbon dioxide. The regenerated solvent 14 is returned to the first solvent scrubber 10. For the purposes of this invention a scrubber is any combination of towers, columns, trays, vessels, pumps, valves, control systems, and any other equipment known in the art useful in facilitating the contact of a liquid and a gas.

The first solvent scrubber overhead gas 11 may comprise hydrocarbons which may be further purified before being used or sold as a useful product. The gas can be treated with a reactive compound, such as ZnO, to further reduce the sulfur content of the gas.

In another aspect of the invention, the first contact zone overhead 5 comprises hydrogen sulfide in addition to carbon dioxide. In this case, hydrogen sulfide is likely to be absorbed in the solvent 14 with the carbon dioxide and included in the regeneration overhead gas stream 13. A third contact zone 16 can be used to remove hydrogen sulfide from the carbon dioxide from the regeneration overhead gas 13. In the third contact zone 16, the regeneration overhead gas 13 comprising hydrogen sulfide and carbon dioxide is contacted with at least a portion 17 of the second contact zone effluent liquid 9. Hydrogen sulfide in the regeneration overhead 13 reacts with ammonium bisulfite and ammonium sulfite present in the portion 17 of the second contact zone effluent liquid 9 that is directed to the third contact zone. The third contact zone 16 produces a third contact zone overhead gas 18 comprising carbon dioxide and a third contact zone effluent liquid 19 comprising ammonium thiosulfate.

The third contact zone effluent liquid 19 can be combined with at least a portion of the first contact zone effluent liquid 4, and the combined liquid fed to the second contact zone 6 as the feed liquid 20. A portion of the feed liquid 20 can be removed as ammonium thiosulfate product 29. In still another aspect of the process, the oxidation potential of the feed liquid 20 is measured. The oxidation potential is then controlled by modulating the amount of sulfur dioxide in the second gas 7 supplied to the second contact zone 6.

In still another embodiment of the process, the second gas 7 comprising sulfur dioxide is supplied to the second contact zone 6 from a Claus unit. A Claus unit is well known by persons skilled in the art and uses the Claus process to convert sulfur-containing species to elemental sulfur. The Claus tail gas 28 comprises sulfur dioxide and other sulfur species. Optionally, prior to being fed to the second contactor 6, the Claus unit tail gas 28 may oxidized in an oxidation reactor to convert the sulfur-containing species to sulfur dioxide.

In one aspect, the second gas 7 can be treated with a sulfur dioxide-removal solvent in a second solvent scrubber 21 prior to entering the second contact zone 6. A portion of the second gas 7 can be bypassed around the second solvent scrubber 21 to form a bypass gas 22. In another aspect, the oxidation potential of the feed liquid 20 to the second contact zone 6 can be controlled by modulating the flow rate of the bypass gas 22. The flow rate of the bypass gas 22 controls the amount of sulfur dioxide supplied to the second contact zone 6. Alternatively, the concentration of sulfite in the feed liquid 20 may be measured with an infrared analyzer. The concentration of sulfite in the feed liquid 20 may be controlled by modulating the flow rate of the bypass gas 22.

In still another aspect, the sulfur dioxide-removal solvent of the second solvent scrubber 21 is regenerated in a second solvent regenerator 23. Regeneration releases sulfur dioxide 30 from the solvent, allowing the solvent to be recycled to the second solvent scrubber 21. The amount of sulfur dioxide remaining in the regenerated solvent 24 determines the capacity of the regenerated solvent to remove sulfur dioxide. Therefore, the amount of sulfur dioxide removed in the second gas 7 from the second solvent scrubber 21 may be controlled by adjusting the amount of sulfur dioxide 30 released from the sulfur dioxide-removal solvent during regeneration in the second solvent regenerator 23. In yet another aspect, the amount of sulfur dioxide released from the sulfur dioxide-removal solvent can be adjusted by modulating the amount of heat added to the reboiler of the second solvent regenerator 23. In a further aspect, the amount of heat added to reboiler of the second solvent 23 can be modulated in response to the oxidation potential of the feed liquid 20 or sulfite ion concentration of the feed liquid 20, measured with an infrared analyzer. Additionally, the flow rate of the sulfur dioxide-removal solvent 24 may also be modulated to control the amount of sulfur dioxide 30 released in the second solvent regenerator 23.

In a further embodiment of the process, ammonia supplied to the second contact zone 6 in the third gas 8 is produced by distilling sour water in two fractionators 25, 26. For the purposes of this invention a fractionator is any combination of towers, columns, trays, vessels pumps, valves, control systems, and any other equipment known in the art useful in facilitating separation of components. Typically, sour water is a waste stream produced by scrubbing ammonia out of a gas stream also comprising hydrogen sulfide. In another aspect, the sour water can be first distilled in a first fractionator 26 prior to entering the second fractionator 25. The first fractionator 26 produces a top gas 27 comprising carbon dioxide and hydrogen sulfide. The second fractionator 25 produces the ammonia in the third gas stream 8.

In a still further embodiment of the process, the amount of ammonia supplied to the second contact zone 6 by the third gas 8 can be modulated in response to the pH in the second contact zone 6. The pH in the second contact zone is indicative of the ratio of ammonium ions to sulfite ions in the second contact zone 6. The pH can be measured with a pH probe. In one embodiment of the process the pH in the second contact zone 6 is maintained at or above about 6.0.

While the invention has been described with reference to several embodiments, it will be understood by those skilled in the art that various changes in form and detail may be made therein without departing from the spirit and scope of the invention.

The invention claimed is:

1. A process for selectively removing sulfur-containing compounds from a gas comprising:
    producing a scrub solution by contacting ammonia and sulfur dioxide with an aqueous solution in a second contact zone;
    contacting a first gas comprising carbon dioxide and hydrogen sulfide with the scrub solution comprising ammonium bisulfite and ammonium sulfite in the first contact zone to produce a first contact zone effluent liquid comprising ammonium thiosulfate and a first contact zone overhead gas comprising carbon dioxide; and
    controlling the pH in the second contact zone by modulating the amount of ammonia supplied to the second contact zone.

2. The process of claim 1 comprising controlling the amount of sulfur dioxide supplied to the second contact zone in response to the oxidation potential of the first contact zone effluent.

3. A process for selectively removing sulfur-containing compounds from a gas comprising:
    (a) contacting a first gas comprising carbon dioxide and hydrogen sulfide with a scrub solution comprising ammonium bisulfite and ammonium sulfite in a first contact zone to produce ammonium thiosulfate, the first contact zone producing a first contact zone overhead gas comprising carbon dioxide and a first contact zone effluent liquid comprising ammonium thiosulfate;
    (b) contacting a second gas comprising sulfur dioxide with a third gas, the third gas comprising ammonia, and a feed liquid, the feed liquid comprising at least a portion of the first contact zone effluent liquid, in a second contact zone to produce ammonium bisulfite and ammonium sulfite, the second contact zone producing a second contact zone effluent liquid comprising ammonium bisulfite and ammonium sulfite;
    (c) controlling the sulfite concentration of the feed liquid; and
    (d) feeding at least a portion of the second contact zone effluent liquid to the first contact zone as the scrub solution.

4. The process of claim 3 comprising:
    measuring the oxidation potential of the first contact zone effluent liquid; and
    modulating the amount of sulfur dioxide supplied to second contact zone in response to the oxidation potential to control the sulfite concentration of the first contact zone effluent liquid.

5. The process of claim 3 comprising:
    measuring the sulfite concentration of first contact zone effluent liquid with an infrared analyzer; and
    modulating the amount of sulfur dioxide supplied to the second contact zone in response to the measured sulfite concentration of the first contact zone effluent liquid.

6. The process of claim 3 comprising:
contacting the first contact zone overhead gas with a solvent in a first solvent scrubber to remove carbon dioxide from the first contact zone overhead gas, the first solvent scrubber producing a first solvent scrubber overhead gas and a first solvent scrubber effluent liquid; and
regenerating the first solvent scrubber effluent liquid to produce a regeneration overhead gas comprising carbon dioxide.

7. The process of claim 6 comprising:
contacting the regeneration overhead gas comprising hydrogen sulfide and carbon dioxide with at least a portion of the second contact zone effluent liquid in a third contact zone to produce a third contact zone overhead gas comprising carbon dioxide and a third contact zone effluent liquid comprising ammonium thiosulfate.

8. The process of claim 7 comprising:
combining the third contact zone effluent liquid with at least a portion of the first contact zone effluent liquid to form the feed liquid supplied to the second contact zone.

9. The process of claim 8 comprising:
measuring the oxidation potential of the feed liquid; and
modulating the amount of sulfur dioxide supplied to the second contact zone in response to the oxidation potential.

10. The process of claim 3 wherein the second gas supplied to the second contact zone is a Claus unit tail gas.

11. The process of claim 10 wherein the Claus unit tail gas is oxidized prior to entering the second contact zone.

12. The process of claim 10 wherein the second gas is treated with a sulfur dioxide-removal solvent in a second solvent scrubber prior to the second contact zone.

13. The process of claim 12 comprising bypassing the second solvent scrubber with a portion of the second gas to form a bypass gas.

14. The process of claim 13 comprising controlling the oxidation potential of the portion of the feed liquid to the second contact zone by modulating the flow rate of the bypass gas.

15. The process of claim 13 comprising:
measuring the concentration of sulfite in the feed liquid with an infrared analyzer; and
controlling the concentration of sulfite in the feed liquid by modulating the flow rate of the bypass gas.

16. The process of claim 12 comprising:
regenerating the sulfur dioxide-removal solvent in a second solvent regenerator; and
controlling the amount of sulfur dioxide removed from the second gas by adjusting the amount of sulfur dioxide released from the sulfur dioxide-removal solvent during regeneration.

17. The process of claim 16 wherein the amount of sulfur dioxide released from the sulfur dioxide-removal solvent is adjusted by modulating the amount of heat added to the second solvent regenerator.

18. The process of claim 16 wherein the amount of sulfur dioxide released from the sulfur dioxide-removal solvent is adjusted by modulating the flow rate of the sulfur dioxide-removal solvent.

19. The process of claim 16 comprising:
measuring the oxidation potential of the feed liquid to the second contact zone; and
modulating the amount of heat added to a second solvent regenerator reboiler in response to the oxidation potential.

20. The process of claim 16 comprising:
measuring the sulfite concentration of the feed liquid to the second contact zone with an infrared analyzer; and
controlling the amount of heat added to the second solvent regenerator reboiler in response to the sulfite concentration.

21. The process of claim 3 comprising distilling sour water in a second fractionator to produce the ammonia supplied to the second contact zone in the third gas.

22. The process of claim 21 comprising fractionating the sour water in a first fractionator prior to entering the second fractionator to produce a top gas comprising hydrogen sulfide.

23. The process of claim 3 comprising controlling the pH in the second contact zone by modulating the amount of ammonia supplied to the second contact zone.

24. A process for selectively removing sulfur-containing compounds from a gas comprising:
(a) contacting a first gas comprising carbon dioxide and hydrogen sulfide with a scrub solution comprising ammonium bisulfite and ammonium sulfite in a first contact zone to produce ammonium thiosulfate, the first contact zone producing a first contact zone overhead gas comprising carbon dioxide and a first contact zone effluent liquid comprising ammonium thiosulfate;
(b) contacting a second gas comprising sulfur dioxide with a third gas, the third gas comprising ammonia, and a feed liquid in a second contact zone to produce ammonium bisulfite and ammonium sulfite, the second contact zone producing a second contact zone overhead gas and a second contact zone effluent liquid comprising ammonium bisulfite and ammonium sulfite;
(c) feeding at least a portion of the second contact zone effluent liquid to the first contact zone as the scrub solution;
(d) contacting the first contact zone overhead gas with a first solvent in a first solvent scrubber to remove carbon dioxide and hydrogen sulfide from the first contact zone overhead gas, the first solvent scrubber producing a first solvent scrubber overhead gas and a first solvent scrubber effluent liquid;
(e) regenerating the first solvent scrubber effluent liquid to produce a regeneration overhead gas comprising carbon dioxide and hydrogen sulfide;
(f) contacting the regeneration overhead gas with a second portion of the second contact zone effluent liquid in a third contact zone to produce a third contact zone overhead gas comprising carbon dioxide and a third contact zone effluent liquid comprising ammonium thiosulfate;
(g) combining the third contact zone effluent liquid with the first contact zone effluent liquid to form the feed liquid to the second contact zone; and
(h) removing a portion of the feed liquid as product.

25. The process of claim 24 comprising:
measuring the oxidation potential of the feed liquid; and
controlling the oxidation potential of the feed liquid by modulating the amount of sulfur dioxide supplied to the second contact zone.

26. The process of claim 24 comprising:
treating the second gas with a sulfur-removal solvent in a second solvent scrubber prior to the second contact zone;
bypassing the second solvent scrubber with a portion of the second gas; and
controlling the oxidation potential of the feed solution by modulating the flow rate of the bypassed portion of the second gas.

* * * * *